United States Patent [19]

Jinnai et al.

[11] Patent Number: 4,965,682
[45] Date of Patent: Oct. 23, 1990

[54] SPEED CONTROL DEVICE

[75] Inventors: Shigeru Jinnai; Nobuo Fukushima, both of Kanagawa, Japan

[73] Assignee: Canon Kabushiki Kaisha, Tokyo, Japan

[21] Appl. No.: 320,987

[22] Filed: Mar. 9, 1989

[30] Foreign Application Priority Data

Mar. 11, 1988 [JP] Japan .............................. 63-057757
May 31, 1988 [JP] Japan .............................. 63-131740

[51] Int. Cl.$^5$ ...................... G11B 19/247; H02P 5/06
[52] U.S. Cl. .............................. 360/73.03; 360/73.09; 388/810
[58] Field of Search ............... 360/73.01, 73.03, 73.09; 388/810, 815, 845, 847, 906

[56] References Cited

U.S. PATENT DOCUMENTS 4,580,084  4/1986  Takahashi et al. ................. 388/845
4,816,937  3/1989  Fukushima ....................... 360/73.03

*Primary Examiner*—Alan Faber
*Assistant Examiner*—David L. Robertson
*Attorney, Agent, or Firm*—Robin, Blecker, Daley & Driscoll

[57] ABSTRACT

A speed control device for controlling the speed of an electric motor for rotating a recording medium by a feedback control system including a proportion term proportional to information on a deviation of the speed of the motor from a speed set value and an integration term obtained by integrating the information of the deviation with respect to time. The value of the difference between a stationary term obtained when the head is loaded on the recording medium and a stationary term obtained when the head is unloaded is previously memorized about each of head load positions. Depending on the head load position, the memorized corresponding stationary term is supplied to the feedback control system, whereby the speed of the motor is maintained constant despite a change in the load.

25 Claims, 12 Drawing Sheets

(INNERMOST CIRCUMFERENCE IS THE 50TH TRACK)

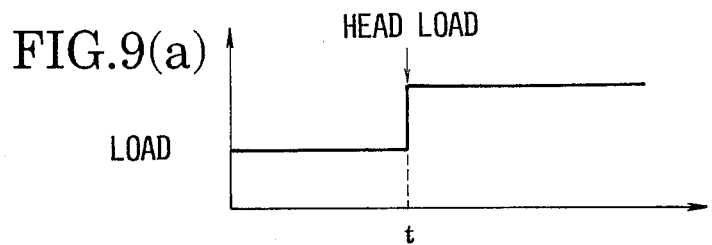
FIG.9(a) LOAD — HEAD LOAD
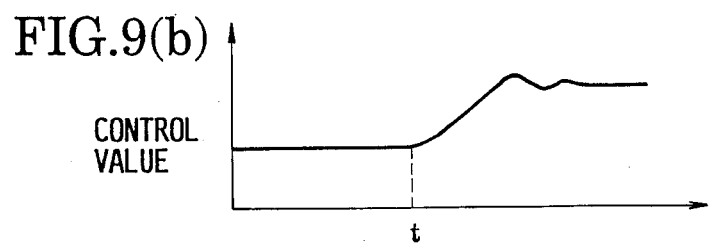
FIG.9(b) CONTROL VALUE
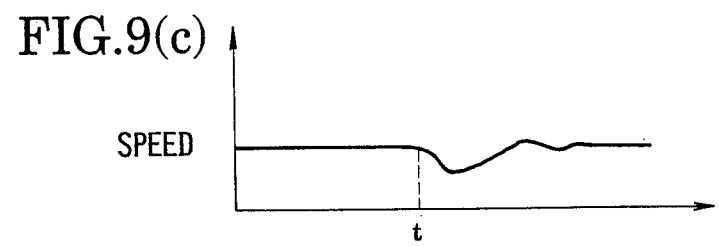
FIG.9(c) SPEED
} PRIOR ART
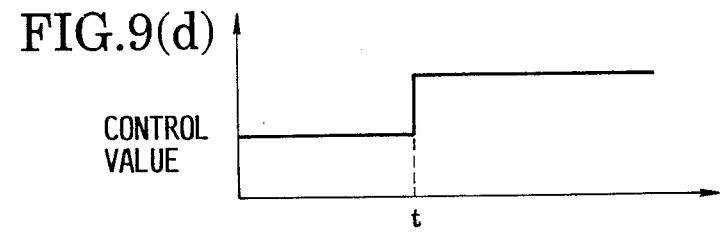
FIG.9(d) CONTROL VALUE
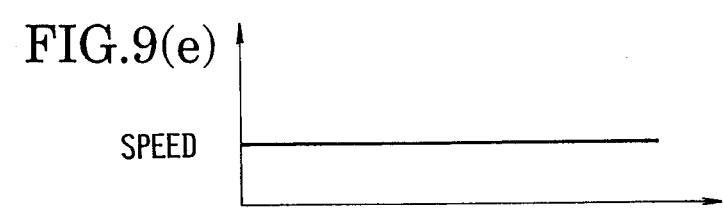
FIG.9(e) SPEED
} INVENTION

SPEED CONTROL DEVICE

BACKGROUND OF THE INVENTION

1. Field of the Invention

This invention relates to speed control devices in rotative drive systems.

2. Description of the Related Art

In the rotative drive systems, a wide variety of types of control devices have been proposed. The speed control devices in the rotative drive systems generally operate in such a manner that the motor is driven on the basis of a set value of speed and at the same time the actual speed of the motor is sensed on detection of a difference from the set value to feed it back to the control signal. To further diminish the error of the actual speed against the set value, in most cases, not only the proportion term proportional to the above-described difference but also an integration term of that difference with respect to time is made to be included in the control information to be fed back. With such an arrangement, the stabilization of the drive control of the motor at constant speed is improved.

The above-described feedback servo system has found its use even in, for example, that type of the speed control device which is adapted to the still video apparatus for recording still pictures on a magnetic disc called "video floppy" disc, and reproducing them from it wherein the motor has to rotate the video floppy disc at a constant speed. head is arranged to move vertically and radially relative to the recording surface of the magnetic disc. To carry out recording or reproduction, the magnetic disc is first rotated at a constant speed and the magnetic head is then moved to come into contact with the recording surface of the magnetic disc and then carries out recording or reproducing concentrically. Further by moving the magnetic head radially, a track to be recorded or reproduced is chosen.

In the above-described still video apparatus or the like, however, the load on the motor of rotating the magnetic disc at a constant speed varies to a large extent between when the magnetic head is accessing the magnetic disc in contact relation and when the magnetic head is separated from the magnetic disc. Therefore, even though the motor for rotating the magnetic disc is provided with such a magnetic disc rotation control system as described above so that it is controlled always so as to be rotated at a constant speed, when, while the disc is in the stationary rotation state, the head is loaded onto the disc, the load of the motor changes, which in turn causes a change of the speed. Since it has no special control system that responds to this change of the load, that part of the variation of the speed which is attributable to the change of the load amounts to a great proportion. This constitutes a problem that it takes a long time to return again to the stationary speed. Another problem arises from the difference in the motor load between when the head is in contact with the inner circumference side of the disc and when the head is in contact with the outer circumference side. In this case, it is impossible to rotate the disc under the condition that the load remains the same over the entire length of the radius of the disc. Hence, a speed control means which is effective to this has been desired.

Meanwhile, in such a feedback servo system for the motor, for the purpose of swiftly effecting start-up of the motor, means may be provided for memorizing the above-described stationary error or integration term of the feedback control system and, after the start of rotation of the motor, detecting when the proportion term becomes "0", thereupon supplying the memorized value of the integration term, as disclosed in U.S. Pat. No. 4,580,084.

According to U.S. Pat. No. 5,580,084, however, all what is memorized is only that value of the integration term which is obtained at the time of the stationary rotation. On this account, that technique is difficult to be applied to, for example, the above-described still video apparatus or the like, where even the changes of the load resulting from the transition from the head load condition to the head unload condition or vice versa, and further from the variation of the relative position of the head to the disc must be taken into account. In the apparatus having such a wide range of variation of the load, therefore, no sufficient performance could not be obtained. In more detail, even if the value of the integration term obtained at the time of the stationary rotation under the usual condition, for example, of no load or a certain load is supplied, occurrence of a change of the load condition does not allow the motor to swiftly return to the stationary rotation state. In application to the still video camera or like apparatus where a fast ramp characteristic is required in view of snap shots and moreover the load differs with different radial positions of records on the disc, therefore, there is a problem that no sensible motor control can be performed.

Another example of the technique of memorizing the value of the integration term obtained at the time of the stationary rotation and applying it when the motor is rotating is shown in U.S. Pat. No. 4,816,937. Even this example has a similar problem. Also, as the servo system of this kind, mention may be made of U.S. Pat. No. 4,855,654.

SUMMARY OF THE INVENTION

The present invention has been made to eliminate the above-described problems. A first object of the invention is to provide a speed control device which has an extremely small speed variation even against load variation and can swiftly control the speed to the stationary rotation state.

Another object of the invention is to provide a speed control device for controlling the speed of an electric motor by a feedback control system including a proportion term proportional to information on a deviation of the speed of the motor from a speed set value and an integration term obtained by integrating the information on the deviation with respect to time, wherein the integration term capable of optimum control in response to the load condition of the motor is previously memorized and in the next operation its optimum integration term can be supplied to the speed feedback control system, so that despite the variation of the load of the motor, the stationary rotation state in its load condition can always swiftly be obtained, thus improving not only the ramp characteristic of the motor but also the stability of the speed against the variation of the load and the fidelity.

In such an environment, according to a preferred embodiment of the invention applied to a speed control device for controlling the speed of a motor by a feedback control system including a proportion term proportional to information on a deviation of the speed of the motor from a speed set value and an integration term obtained by integrating the information on the deviation with respect to time, the speed control device comprises motor driving means for rotating the motor in a plurality of load conditions including a reference load condition, memory means for storing respective values in the plurality of load conditions of the difference in the integration term obtained between when the motor has come into a stationary rotation state in the reference load condition and when the motor has come into the stationary rotation state in a load condition other than the reference load condition, and control means for controlling a rotation of the motor by using a value of the difference in the integration term stored by the memory means and corresponding to a load condition in which the motor is.

Another object of the invention is to provide a recording or reproducing apparatus in which, regardless of whatever track on the disc is accessed by the head, it is from the address of that track that the integration term in the stationary rotation in a condition where the head is loaded to that track can immediately be set to the speed feedback control system, thus achieving a great improvement of the ramp characteristic of the rotation of the disc as is independent of any load condition of the head.

In such an environment, according to the invention, in a preferred embodiment thereof applied to a recording or reproducing apparatus for performing a recording or reproduction by bringing a head into contact with a driven recording medium, the recording or reproducing apparatus comprises speed control means having a control system including a proportion term proportional to information on the difference between a speed set value and a driving speed of the recording medium and an integration term obtained by integrating the information on the difference with respect to time, head loading means for controlling the head to be in one of a head load condition in which the head is in contact with the recording medium and a head unload condition in which the head is separated therefrom, head moving means for moving the head to an arbitrary position on the recording medium, memory means for storing the difference in the integration term obtained between at the time of a stationary drive speed of the recording medium in the head unload condition and at the time of the stationary drive speed in the head load condition in each position of the head moved by the head moving means, and supply means for supplying the integration term corresponding to a position of the head in the head load condition to the speed control means.

In another preferred embodiment of the invention applied to a recording or reproducing apparatus for performing a recording or reproduction by bringing a head into contact with a driven recording medium, the recording or reproducing apparatus comprises speed control means for controlling a motor for rotating the recording medium to rotate at a constant speed by a speed control value corresponding to information on the difference between a speed set value and a rotation speed of the motor, head loading means for controlling the head to be in one of a head load condition in which the head is in contact with the recording medium and a head unload condition in which the head is separated therefrom, head moving means for moving the head to an arbitrary position on the recording medium, memory means for storing a speed control value of the motor in a stationary rotation state in the load condition in each position of the head moved by the head moving means, and supply means for supplying a speed control value corresponding to a position of the head in the head load condition to the speed control means.

Yet another object of the invention is to provide a speed control system having good responsiveness and stability with a very strong resistance to load changes.

Other objects of the invention and its features will become apparent from the following description and the drawings.

BRIEF DESCRIPTION OF THE DRAWINGS

FIGS. 9(a) to 9(e) are wave-form diagrams illustrating speed response characteristics.

DETAILED DESCRIPTION OF THE PREFERRED EMBODIMENTS

The present invention is next described in connection with examples of application of the speed control device thereof to the still video apparatus with reference to the drawings.

Figure 1:
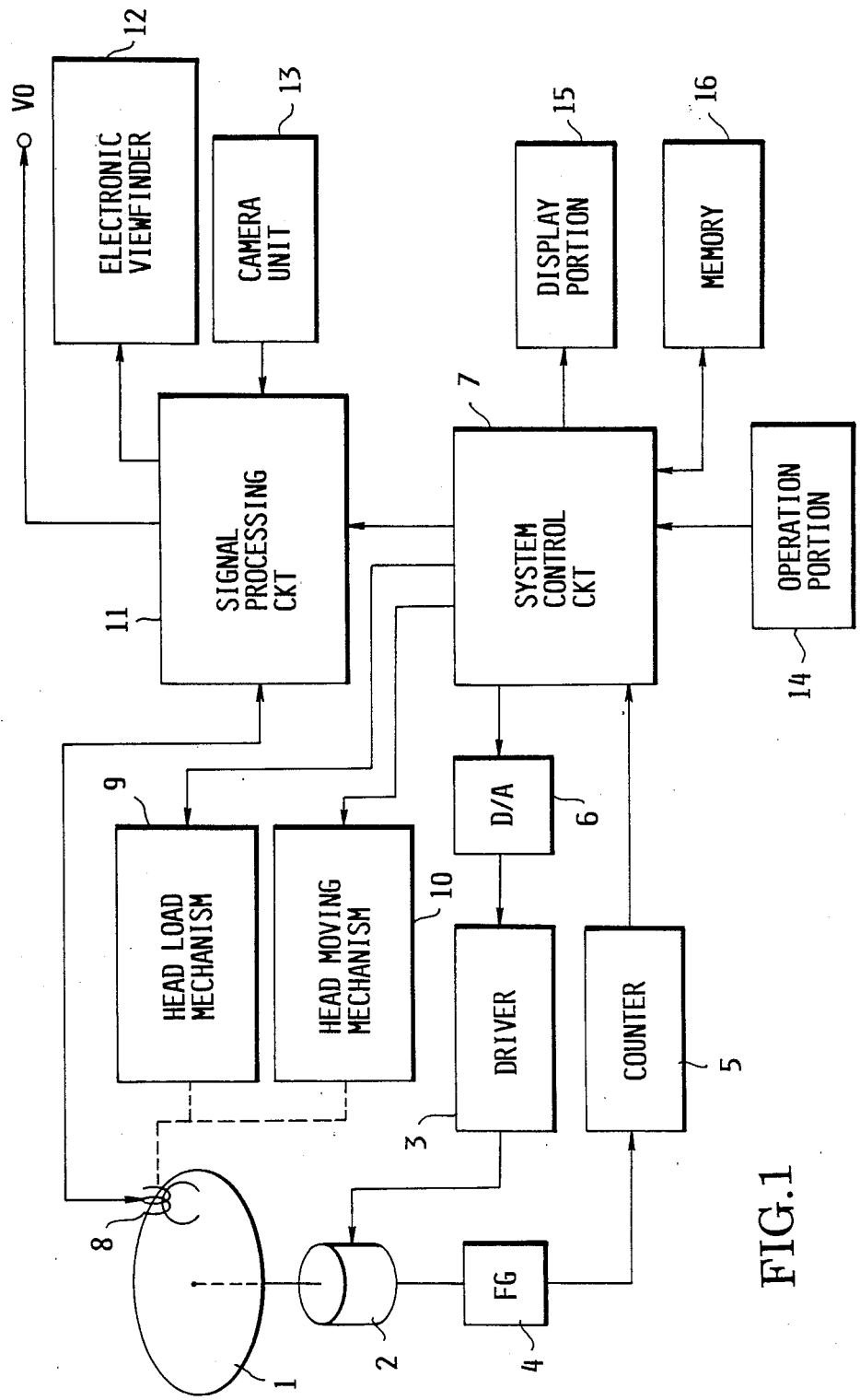
FIG. 1 is a block diagram of a still video apparatus to which the speed control device of the invention is applied.

FIG. 1 in block diagram shows a still video system. In FIG. 1, a magnetic disc 1 is driven to rotate at a predetermined speed by an electric motor 2. A driver 3 drives the motor 2. An FG pulse generator 4 forms a number of pulses corresponding to the speed of rotation of the motor 2. A counter 5 counts the FG pulses output from the FG pulse generator 4, producing information representing the speed of rotation, which is supplied to a system control circuit 7. A D/A converter 6 converts the speed information output from the system control circuit 7 into an analog signal and supplies it to the driver 3. The system control circuit 7 controls coordination of all the circuits described above, thus controlling the motor 2 so that the disc 1 is caused to rotate at a constant speed.

Reference numeral 8 is a magnetic head for performing a recording or reproduction on the magnetic disc 1. A head load mechanism 9 brings or takes the magnetic head 8 into or out of contact with a recording surface of the magnetic disc 1. A head moving mechanism 10 moves the magnetic head 8 in steps of a predetermined distance in the radial direction of the magnetic disc 1 and positions it onto one of a plurality of record tracks concentrically formed on the disc 1. These head control means are arranged so that they are also controlled by the commands of the system control circuit 7.

Meanwhile, a camera unit 13 supplies video signals for a shot picture to a signal processing circuit 11 where predetermined treatments are applied to them to produce an output in a suitable form to be recorded on the magnetic disc 1. This output is supplied to the magnetic head 8. The signals recorded on the magnetic disc 1 are reproduced by the magnetic head 8. The reproduced video signals are subjected to predetermined treatments in the common signal processing circuit 11, of which the output is supplied to an output terminal VO or an electronic viewfinder 12. This signal processing circuit 11, too, is operated on the basis of the commands of the aforesaid system control circuit 7.

Again, in FIG. 1, reference numeral 14 is an operation portion having arranged thereon a number of switches for the user to carry out various operations. Any mode in operation and the control information are displayed on a display portion 15. All pieces of information beginning with the integration Kn are stored in or read from a memory 16.

Here, a speed control system for the motor 2 is described. A detection signal indicative of a rotation state of the motor 2 detected by the FG pulse generator 4 and the counter 5 is supplied to the system control circuit 7 and computed with the command value of speed according to a predetermined program previously set in the system control circuit 7. Control information based on the computation result is output. This control information is converted into an analog signal voltage by the D/A converter 6, which is supplied through the driver 3 to the motor 2 for disc rotation. By this arrangement, a speed feedback control system for the motor 2 for disc rotation is constituted.

The equation of this feedback control system can be expressed as $$Y = \underbrace{G_1(N - Nc)}_{\text{Proportion Term}} + \underbrace{Kn}_{\text{Integration Term}} \quad (1)$$

$$Kn = G_2(N - Nc) + K_{n-1} \quad (2)$$

where
Y: control operating value
N: speed
Nc: speed command value (control set value)
$G_2, G_2$: constants
$Kn, K_{n-1}$: integration terms That is, the motor 2, when started to rotate, is driven based on the deviation from the speed command value. Since, at the time of the start-up of the motor 2, the aforesaid deviation is large, the proportion term $G_1(N-Nc)$ greatly acts, while the integration term has little affection. As the speed of rotation of the motor 2 approaches the speed command value, the proportion term gets nearer to "0", while the integration term gets greater to act. In the stationary rotation state, the proportion term is "0" and the integration term takes a constant value.

With the magnetic disc 1 rotating in the stationary rotation state, when the magnetic head 8 is loaded to come into contact with the magnetic disc 1 by the head load mechanism 9, however, the speed is caused to change, because the load on the motor 2 is increased by the pressing contact of the magnetic head 8. At this time, if the same speed control as the usual motor start-up is effected, the proportion term $G_1(N-Nc)$ would gradually decrease while the integration term Kn would gradually increase until the stationary rotation state is reached again. Hence, a slow responsiveness would result and it would take a long time to return to the stationary rotation state.

Differing from this, in the present invention, as the head is loaded or moved under the condition that the magnetic disc is rotating in the stationary rotation state, when the magnitude of the load has changed, a value of the integration term which is obtained at the time of the stationary rotation state for a load after the change is used in the equation (1). By controlling the speed in such a manner, the disc 1 can swiftly be returned to the stationary rotation state.

Figure 2:
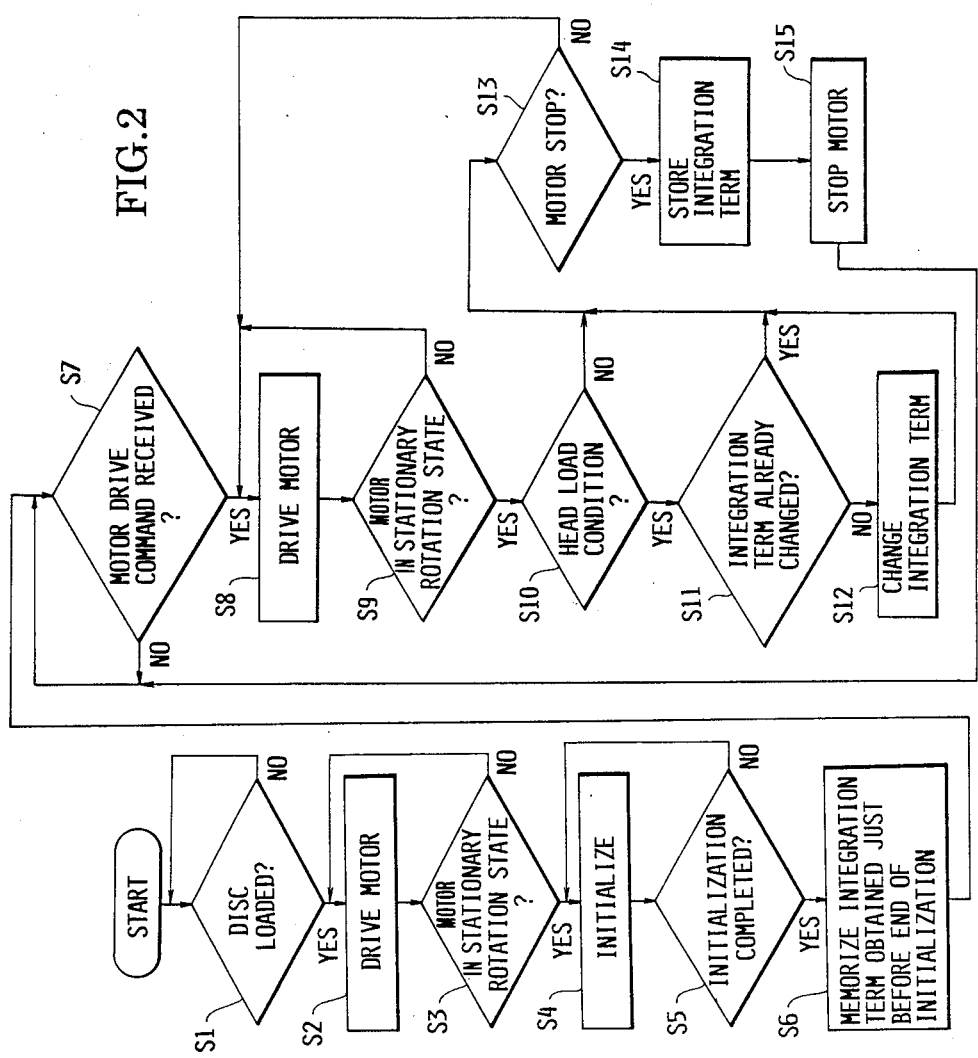
FIG. 2 is a flowchart for explaining the operation of the speed control device, of the invention.

Next, the operation of the speed control device (the operation of the system control circuit 7) is explained by using the flowchart shown in FIG. 2.

Figure 3:
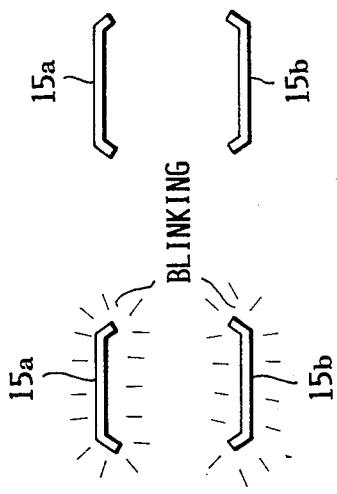
FIGS. 3(a), 3(b) and 3(c) are plan views for explaining the display at the time of initialization of the display portion.

When the fact that the magnetic disc 1 has been loaded into the apparatus is detected in a step S1, the process advances to a step S2 of driving the motor 2 to rotate the disc 1. When the fact that the motor 2 has come into the stationary rotation state is detected in a step S3, the process advances to a step S4 of carrying out an initializing operation to discriminate between the used and fresh tracks on the magnetic disc 1. The initializing operation is to search for a vacant track next to the last recorded one as the head 8 is moved from the innermost track on the disc 1 to the outer tracks successively by the head moving mechanism 10 and then to position the head 8 on that vacant track for the recording purpose. During the initializing, elements 15a and 15b of the display portion 15 shown in FIG. 3(a) are blinking, enabling the user to recognize that the initialization is in progress. Also, FIG. 3(b) shows a case where the elements 15a and 15b are continuously lighted on, indicating that the magnetic disc 1 has been used up. FIG. 3(c) shows another case where the magnetic disc 1 has some fresh tracks. In this case of FIG. 3(c), a display of the number of the track to be next recorded, in this instance, "12", is presented.

When the end of the initialization is confirmed in a step S5, the process advances to a step S6 where the value of the integration term Kn obtained just before the end of the initialization in the speed control equation (1) for the motor 2 is memorized in the memory 16. It should be noted that the memory 16 may be provided in the interior of a unit of the system control circuit 7. When the memorizing of the integration term Kn is complete, the process advances to a step S7 of discriminating between the presence and absence of a start command for the motor 2 given by an operation for recording or reproduction. When the command for starting the motor 2 is received, the process advances to a step S8 where the motor 2 starts to be driven, and its speed is controlled based on the speed control equation (1). When the fact that the motor 2 has come into the stationary rotation state is detected in a step S9, whether or not the head 8 has been set in the head load condition where a recording or reproduction can be effected in a track on the magnetic disc 1 is examined. If it is determined here that the head 8 has been loaded onto the magnetic disc 1, the process then advances to a step S11 of examining whether or not the integration term in the speed control equation (1) for the motor 2 has already been changed to a value of the integration term Kn memorized in the memory 16. If the integration term Kn in the speed control equation (1) is not changed yet, the process then advances to a step S12 where the integration term Kn in the speed control equation (1) is changed to the memorized value in the memory 16. Subsequently, the process advances to a step S13 of examining whether or not, as a predetermined recording, reproduction, or the like ends, a motor stop signal is received. If the motor stop signal is received, the process advances to a step S14 where the integration term Kn obtained at this time in the motor control state (the stationary rotation state just before the stop of the motor) is stored in the memory 16. By this process, the previously stored value in the memory 16 is cleared, and its content is renewed to the present value. In a step S15, the motor 2 is stopped. The process then returns to the step S7, thus waiting for the next motor start. When the next cycle of rotation of the motor 2 is started, the speed can be controlled by using the integration term Kn which has been stored in renewed form in the memory 16.

It should be noted that in the above-described flowchart, in a case where, in the step S10, the head is not in the load condition, or in another case where, in the step S11, the integration term Kn has already been changed, the process jumps to the step S13. If the motor stop signal is received here, the integration term obtained at a time just before the stop in the stationary rotation state is stored. After that, the process returns to the step S7.

In an alternative case where, in the step S13, the motor stop command is not received, as it implies that the disc 1 continues being rotated in the stationary rotation state, the process then returns to the step S8 without storing a new value of the integration term. Subsequently, the process advances past the step S9 to the step S10. If the head is loaded here, the process then advances to the step S11. Because the integration term Kn has already been changed, then without newly changing the integration term, the process transits again to the step S13. Such a procedure repeats itself.

In short, every time the disc 1 is rotated and a head access is carried out, the integration term obtained when the latest head access has been carried out in the stationary rotation state is renewed and memorized. In the still video apparatus, when one cycle of recording (head load, access) ends, the head is advanced to the next record track. It is, therefore, always that when the head is next loaded and the rotation load of the motor is changed, the speed control state is made optimum by supplying the integration term Kn of the feedback system obtained when the disc 1 is rotating in the latest stationary rotation state, or in such a stationary rotation state with a load condition substantially in the head load position, thus swiftly returning to the stable state.

That is, according to the invention, every time the head is loaded, the integration term Kn in the speed control equation (1) obtained at the time of the stationary rotation state at that time is renewed. At the time of motor speed control in the next operation time, it is possible to swiftly approach the stationary rotation state corresponding to its load condition.

It should be noted that though, in the above-described embodiment, the algorithm has been made so that every time the motor is rotated to drive the disc, regardless of the state of the head access, the value of the integration term in the stationary rotation state just before the stop is memorized, it is also possible that by utilizing the fact that at the time of initialization all the tracks are searched by the head 8, the integration term Kn in the speed control equation (1) in the stationary rotation state of every one track is previously memorized in the memory 16, and, after that, when carrying out the head access, the speed control can be made by using the integration term corresponding to the track to which the head has been loaded.

Figure 4:
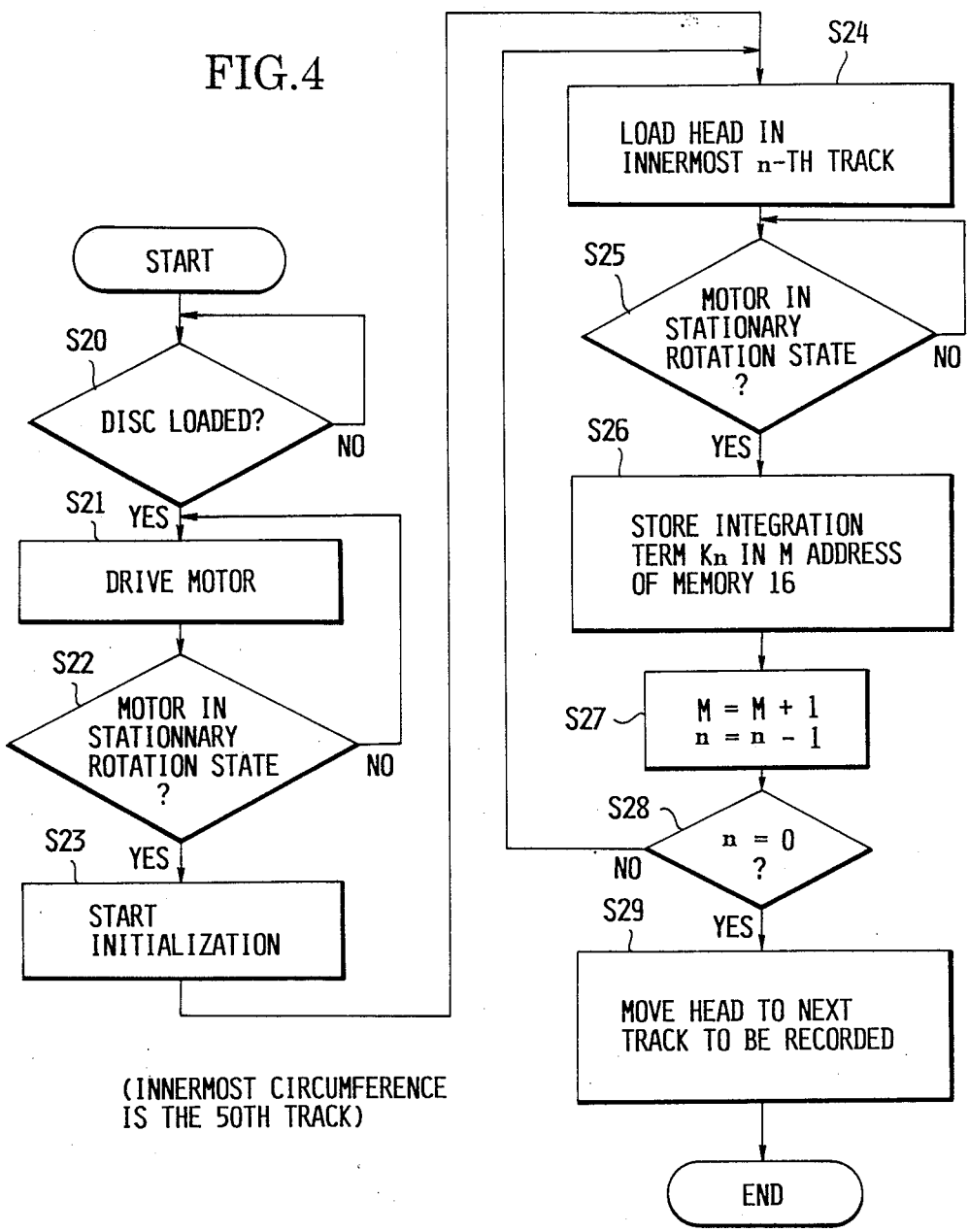
FIG. 4 and FIG. 5 are flowcharts for explaining another embodiment of the invention.
Figure 5:
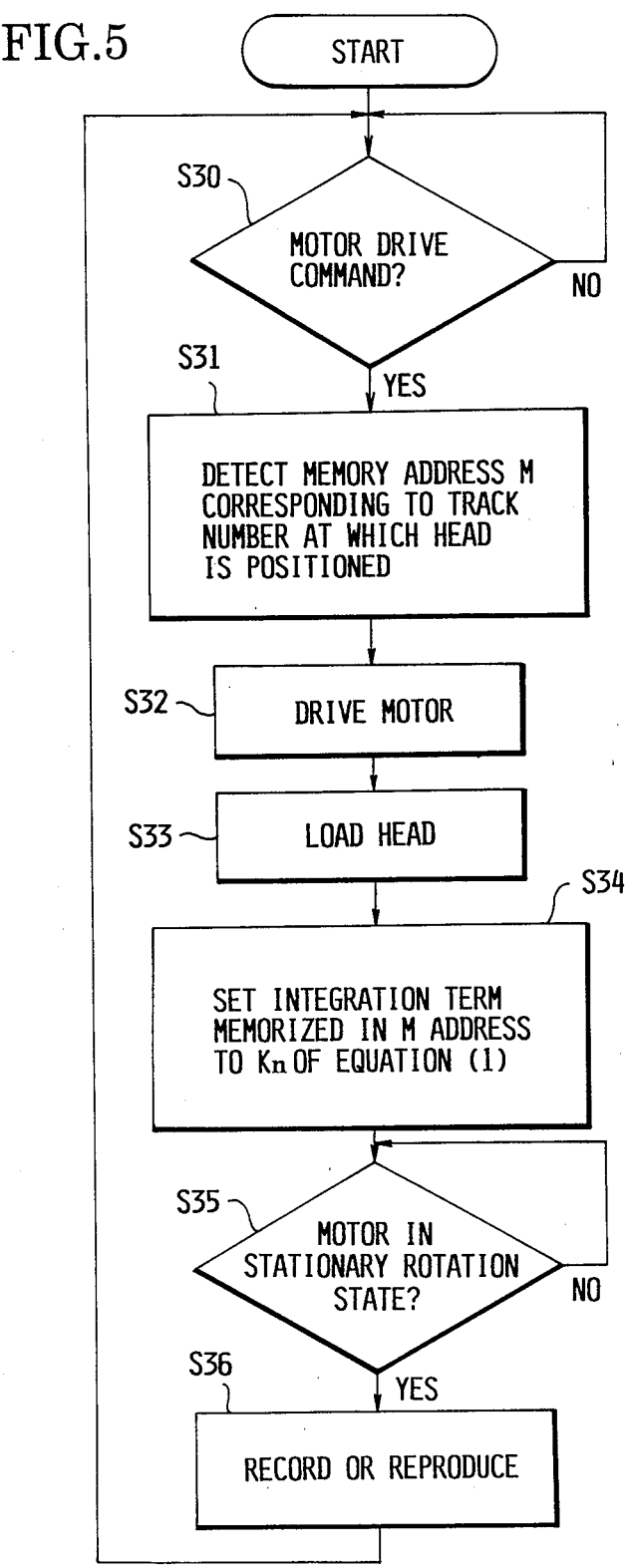

The operation in this case is described by using the flowchart of FIG. 4 and FIG. 5.

At first, when the disc 1 is loaded in a step S20, the motor 2 is driven by the system control circuit 7 in a step S21. In a step S22, the motor 2 is rotated in the stationary rotation state. Thereupon, an initializing operation is started in a step S23. Responsive to the start of the initializing operation, the system control circuit 7, in a step S24, actuates the head moving mechanism 10 to move the head 8 to the innermost track (in the case of the still video apparatus, the 50th track) and then actuates the head load mechanism 9 to bring the head 8 into a head load condition where the head 8 is in contact with the disc 1. When the motor 2 comes into the stationary rotation state in the head load condition in a step S25, the process advances to a step S26 where the integration term Kn at that time in the speed control equation (1) is stored in an M address of the memory 16. In a step S27, the address of the memory M is shifted one and the track address to be accessed by the head 8 is shifted one toward the outer circumference side, that is, in a direction in which the track address becomes smaller. Whether or not the initializing has been completed from the first to the 50th track, that is, whether or not the head has reached the 0th track, is judged in a step S28. If the head 8 does not arrive at the 0th track, as it implies that the initializing is not yet complete, the process then returns to a step S24 where the head 8 is moved to the next track and the value of the integration term Kn at that time in the stationary rotation state is stored in the memory 16. Subsequently, such a procedure is repeated until the head position becomes the 0th track. As the head 8 has moved across the 50th through the first track, when the integration term Kn in each track has been stored in the memory 16, the process goes out of the above-described loop of the step S24 through the step S28 and transfers to a step S29 where the head is moved to a vacant track to be next recorded, thus ending the initializing operation.

By this process, within the memory 16, it results that a memorized table of the values of the integration term at the time of the stationary rotation state for all the tracks in the head load condition is formed.

To carry out the next recording or reproducing operation, the magnetic disc 1 is rotated and the head is loaded onto tracks on the disc 1. As shown in the flowchart of FIG. 5, when a start command for the motor 2 is sent out from the system control circuit 7 in a step S30, the memory address M in which the integration term Kn corresponding to the track number for the position of the head has been stored is examined in a step S31. The motor 2 is then driven in a step S32. Then the head is loaded in a step S33. The value of the integration term Kn in the memory address examined in the step S31 is set to the integration term Kn in the speed control equation (1) in a step S34. Thus the motor 2 is controlled in feedback fashion. After the motor 2 has come into the stationary rotation state in a step S35, a recording or reproduction is carried out by the head 8 in a predetermined track on the disc 1 in a step S36. After that, the process returns to the step S30, waiting for the next command.

That is, with the head 8 accessing any track whatever on the disc 1, from the address of that track, the integration term at the time of the stationary rotation state in the condition where the head has been loaded to that track can instantly be set in the speed feedback control system. Hence, regardless of the load position of the head, the ramp characteristic of rotation of the disc 1 is remarkably improved. The algorithm too can be simplified.

As has been described above, according to the speed control device in the invention, in the speed control device which performs speed control of the motor by the feedback control system including the proportion term proportional to information of the deviation of the speed of the motor from the set value and the integration term of the deviation integrated with respect to time, the integration term capable of optimum control in response to the load condition of the motor is previously memorized and in the next operation that optimum integration term can be provided to the speed feedback control system. Therefore, despite variation of the load of the motor, the stationary rotation state in that load condition can always swiftly be obtained, giving not only an advantage that the ramp characteristic of the motor improves, but another advantage that it does not vary by the load so that the stability and the fidelity are improved. Also without confining it to the still video apparatus, a speed control device which is applicable to many purposes can be realized.

FIG. 6 to FIGS. 10(a) and 10(b) show another embodiment of the speed control device according to the invention. This embodiment adds improvements to the foregoing embodiment, disclosing a speed control device having a better responsiveness to changes of the load condition and operating in easy control by memorizing the difference between the stationary term in one of a plurality of load conditions to the motor which becomes a reference one and the stationary term in each of the other load conditions.

Figure 6:
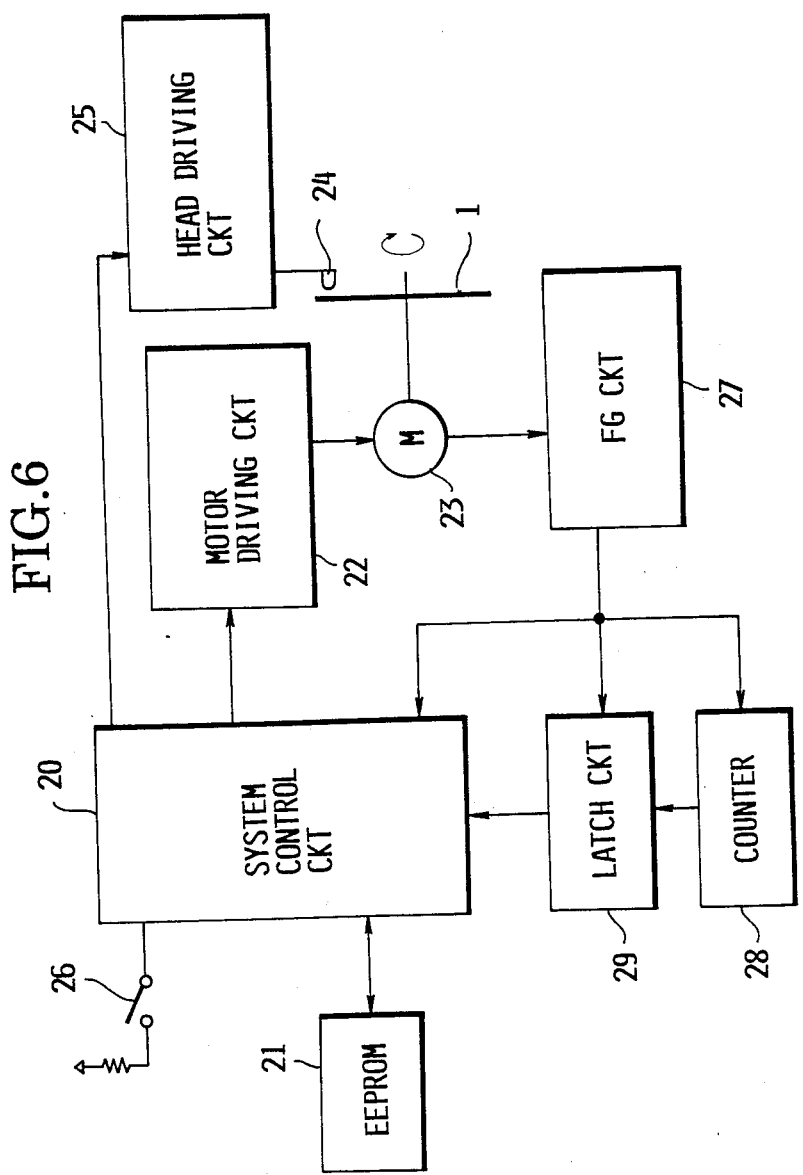
FIG. 6 is a fragmentary block diagram illustrating still another embodiment of the invention.

FIG. 6 is a block diagram illustrating the outline of the construction of this embodiment. Similarly to the foregoing, an example of application of the invention to the control device for disc rotation of the still video camera is described.

In FIG. 6, a system control circuit 20 performs the whole of speed control and carries out various kinds of computation, being constructed with a central processing unit CPU, a RAM for storing various kinds of constants required for control, variables in the course of computation, etc. and a ROM storing a program for the control sequence to be described later. An EEPROM (Electrically Erasable Programmable Read-Only Memory) 21 stores the differences in the stationary output of the motor between the head unload state and the head load state in each track position on the disc computed according to the process to be described later. A motor driving circuit 22 drives a motor 23 on the basis of a control signal output from the system control circuit 20.

Reference numeral 1 is a disc-shaped recording medium to be driven to rotate by the motor 23. A head 24 performs a recording or reproduction in each of the concentric tracks on the disc-shaped recording medium 1. A head driving circuit 25 drives the recording head 24 to move radially of the disc-shaped recording medium 1, thereby changing the record position based on the record signal output from the system control circuit 20. 26 is a switch for actuating start of motion of the motor 23. Also, 27 is an FG (Frequency Generator) circuit. The FG circuit 27 generates FG pulses of a period proportional to the period of rotation of the motor 23, for example, fifteen pulses a revolution of the motor 23.

A counter 28 is reset by the rising edge of an FG pulse output from the FG circuit 27 and counts up clock pulses from 0 until the rising edge of the next FG pulse. A latch circuit 29 holds the content of the counter 28 in every one rising edge of the FG pulse signal to be input.

Figure 7:
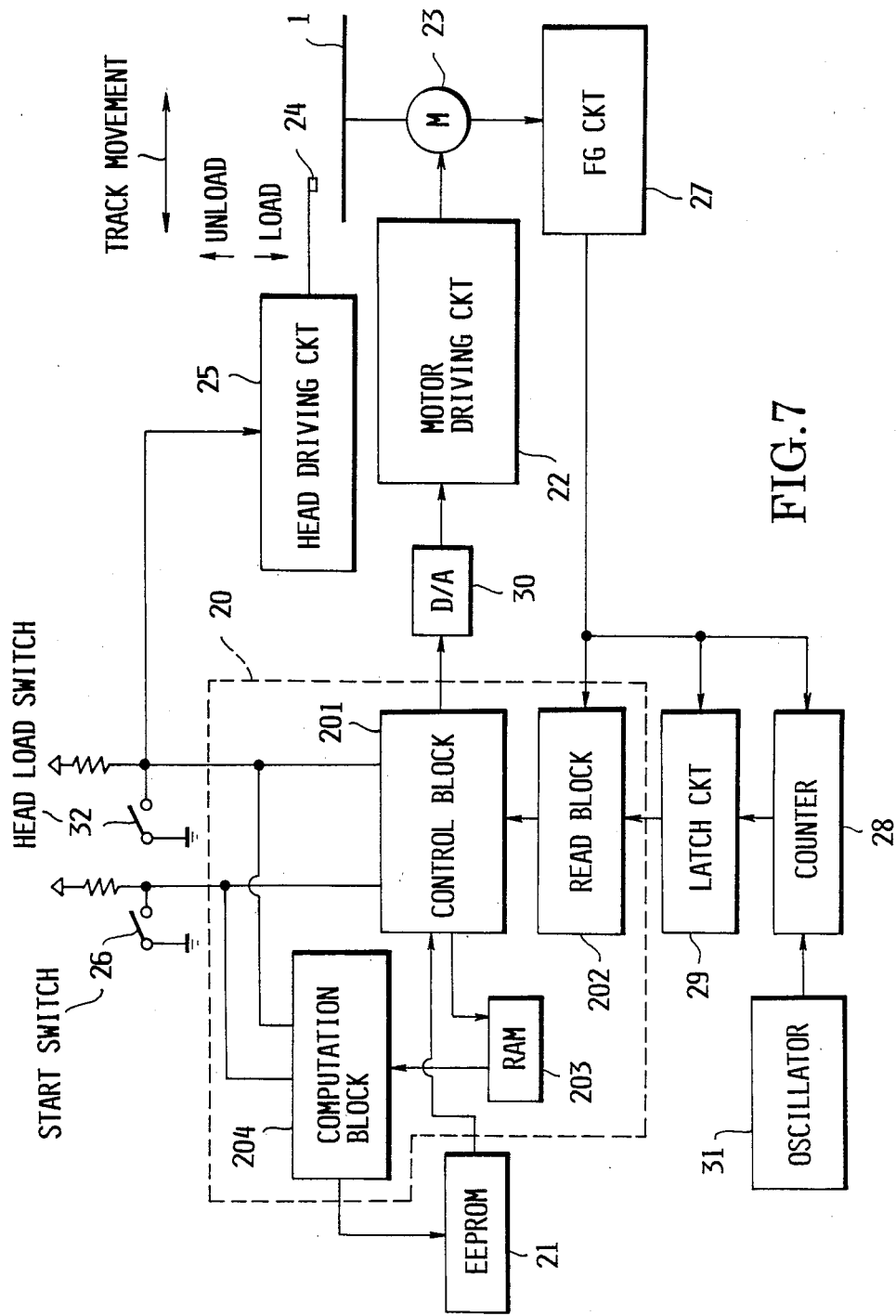
FIG. 7 is a block diagram of the details of FIG. 6.

FIG. 7 is a block diagram as obtained by decomposing the block diagram of FIG. 6 to further clarify each function. On the drawing, as to those blocks which remain unchanged from FIG. 6, the same reference numerals are used to denote them.

In FIG. 7, a clock oscillator 31 supplies clock pulses for measurement of the FG period to the counter 28 for measuring the intervals between the FG pulses supplied from the FG circuit 27, oscillating a clock of sufficiently higher frequency, for example, 4M Hz, than that of the FG pulses. The counter 28 is arranged so that each time one FG pulse is received, it produces an output representing the number of pulses counted from the rising edge of the preceding FG pulse to the rising edge of that FG pulse as has been described above and is reset and starts again counting. The latch circuit 29 holds the output counted value of the counter 28 in each input of the FG pulse and supplies it to a read block to be described later.

The system control circuit 20 comprises a control block 201, a read block 202, a RAM 203 and a computation block 204. The control block 201 performs various controls according to a control program previously stored, being constructed with a microcomputer. Concretely speaking, it controls the speed of the motor based on the counted value read from the read block 202 and, while reading the output difference in the stationary rotation state from the EEPROM 21 in response to the head load signal, corrects the control value.

The read block 202 reads the clock pulse counted number in between the FG pulses latched by the latch circuit 29 and supplies it to the control block 201. The RAM 203 memorizes the control output value (integration term) in the stationary speed before and after the load of the head 24 onto the recording medium 1. The computation block 204 reads the control output values (integration terms) before and after the head load memorized in the RAM 203 respectively and computes their difference and supplies it to the EEPROM 21. The result computed in the computation block 204 is stored in the EEPROM 21. By this process, within the EEPROM 21, a table of stationary terms in which the control output values in the stationary speed before and after the head load are stored in each position of the head to the recording medium is formed. In the following, the control block 21 becomes possible to make speed control in each individual load condition, while referring to this table in the EEPROM 21.

A D/A converter 30 converts the speed control value determined from the data read from the EEPROM 21 in the control block 201, the FG interval data from the read block 202, etc. into an analog voltage and supplies it to the motor driving circuit 22.

Also, a head load switch 32, when turned on, actuates the head driving circuit 25 to load the head 24 onto the recording medium 1, thereby rendering it operative for recording. Also, the head driving circuit 25 moves the head 24 on the recording medium 1 in the radial direction on the basis of the actuation of an operating switch (not shown) for track transportation and automatically by a command from the system control circuit 20. Thus, the recording or reproducing position can be changed to each concentric track on the recording medium 1.

Next, the program for the control operation of the thus formed speed control device is described with reference to FIGS. 8(a) and 8(b).

At first, from the stop state of the motor 23, in a step 101, whether or not the switch 26 for start-up has been turned on is judged. When the switch 26 is turned on, the motor 23 is driven by a constant output in a step S102.

At the same time when the motor 23 rotates, the FG pulses of the frequency corresponding to the number of revolutions of the motor 23 from the FG circuit 27 are supplied to the counter 28. The counter 28 counts the clock pulses of the clock oscillator 31. Each time the FG pulse is input, a counted value is output to the latch circuit 29, and it is reset and starts again counting. Such an operation is repeated.

The latch circuit 29 responsive to input of each FG pulse latches the counted value of the counter 28 and supplies it to the read block 202. In timing with the FG pulse, the read block 202 also supplies the latch data as the speed value to the control block 201. In a step S103, whether or not the speed of the motor 23 has reached almost the stationary speed, for example, about 2% lower speed than the set stationary speed is judged by reading the counted value latched by the latch circuit 29 through the read block 202 into the control block 201. At a time when it has become almost stationary speed, the process advances to a step S104. Subsequently, each time the FG pulse is supplied from the FG circuit 27, the counted value of the counter 28 is latched by the latch circuit 29 (step S105), and supplied through the read block 202 to the control block 201. In the control block 201, the motor speed is sought from the FG pulse interval read from the read block 202. Further, based on the difference of it from the speed set value, the speed control value of the motor is computed (step S106). Its output is converted by the D/A converter 30 into an analog control voltage which is then supplied to the motor driving circuit 22 to control the rotation of the motor 23 (step S107). Also, the control value $Y_1$ output from the control block 201 corresponding to the integration term obtained when the motor has come into a stationary rotation state is stored in the RAM 203 at a predetermined area (step S108).

An example of computation of this speed control value is shown as follows:

$$Y = K_1(C - C_0) + K_2 Z(C - C_0) + K_3$$

where
Y: control value
C: count value
$C_0$: theoretical counted value at the stationary speed time
$K_1, K_2, K_3$: constants
($K_3$ is the integration term at the stationary rotation time in the head unload condition)

Subsequently, the process advances to a step S109 where whether or not the switch 32 is actuated, or whether or not the command for head load is output from the system control circuit 20 is discriminated. In a case where the head load command is not output, the process returns to the step S104 and performs the above-described speed detection sequence repeatedly.

In a case where, in the step S109, the held 24 has been loaded by the head drive circuit 25 onto a predetermined track position on the recording medium 1, the process advances to a step S110 where the previously stored value of the difference between the integration term at the stationary rotation time in its loaded condition of the head and the integration term at the stationary rotation time in the head unload condition is read from the EEPROM 21 into the control block 201. In a step S111, data $K_4$ of the difference between the integration terms read from the EEPROM 21 is added to the constant $K_3$ of the above-described example of computation. The value of "$K_3 + K_4$" is then output (step S111). By this process, the speed of the motor 23 is controlled so as to come into the stationary rotation state under the condition where the load is increased by the head load. Therefore, the motor 23, though a change of the load has occurred, swiftly comes into the stationary rotation state.

After the head load, in steps S112 to S115, similarly to the above-described steps S105 to S107, the operation of controlling the motor 23 to the set speed in such a manner that each time the FG pulse rises, the counted number of clock pulses is latched and the speed of the motor is determined, is repeatedly carried out. In a step S116, the control value $Y_2$ at the stationary rotation time after the head load is stored in the RAM 203 at a predetermined area.

In a step S117, whether or not a stop command for the motor 23 is output is discriminated. If the stop command is not output, the process then returns to the step S112 and continues controlling to maintain constant the rotation speed of the motor in the head load condition by detecting the FG pulse interval in every input of the FG pulse.

Also, in the step S117, if the stop command for the motor 23 is output, the process then advances to a step S118. After the value $(Y_2 - Y_1)$ obtained by subtracting the control value $Y_1$ (step S108) in the head unload condition from the control value $Y_2$ (step S116) in the above-described head load condition has been stored, as renewed, in the predetermined area of the EEPROM 21, the motor 23 is stopped (step S119). The process then returns again to the step S101.

By such an operation, the motor 23 is rotated. When the head 24 is loaded onto a track to be recorded on the recording medium, the rotation speed of the motor 23 changes by the change of the load by the head loading. However, information on the difference between the speed control values (integration terms) at the stationary rotation time in the head unload condition and the head load condition is read from the EEPROM 21 and a compensation is applied to the motor driving circuit 22. Therefore, despite the change of the motor load, the motor can instantly come into the stationary rotation state.

This operation is shown by the speed wave form of the motor in FIGS. 9(a) to 9(e). FIG. 9(a) is a graph illustrating the load change in the motor 23, where with the motor 23 in the stationary rotation state in the head unload condition, it is at a time t that the head 24 is then loaded onto the recording medium 1 by the head driving circuit 25 with the change of the load on the motor 23.

FIGS. 9(b) and 9(c) are graphs illustrating the response of the speed control value, the rotation speed of the motor in the conventional apparatus. Because it cannot instantly respond to the load change, a ringing occurs in waving form. It is understandable that the response delays.

FIGS. 9(d) and 9(e) show the response characteristic of the apparatus of the invention. Because the speed control value of the motor is instantly compensated for by the data corresponding to each head position read from the EEPROM 21 at the same time as the head load, the motor 23 also does not change its speed so that it can continue rotating at a constant speed. Hence, the invention has a very great compensation effect on the load change.

It should be noted that according to the above-described explanation, the operation goes through the motor rotation, the head load, the motor stop in this order. After the head load, the motor is not necessarily stopped. Under this condition, the head 24 may be moved to another track on the recording medium. This case will be described below.

The load in the head load condition differs between when it is loaded onto the inner circumference side track and when onto the outer circumference side track. Therefore, the compensation value varies from track to track at which the head is loaded. If the sequence of the above-described flowcharts shown in FIGS. 8(a) and 8(b) is carried out, the control value (the difference of the integration term from that in the head unload condition) before the stop of the motor is memorized. Therefore, if the above-described flow is executed by each track, the table of the motor speed control value in each track can be formed in the EEPROM. However, if it is modified to such a flowchart as shown in FIGS. 10(a) and 10(b), it will not be necessary to stop the motor 23, so that the motor control value in each moved position of the head can be stored in the EEPROM 21.

Figure 8A:
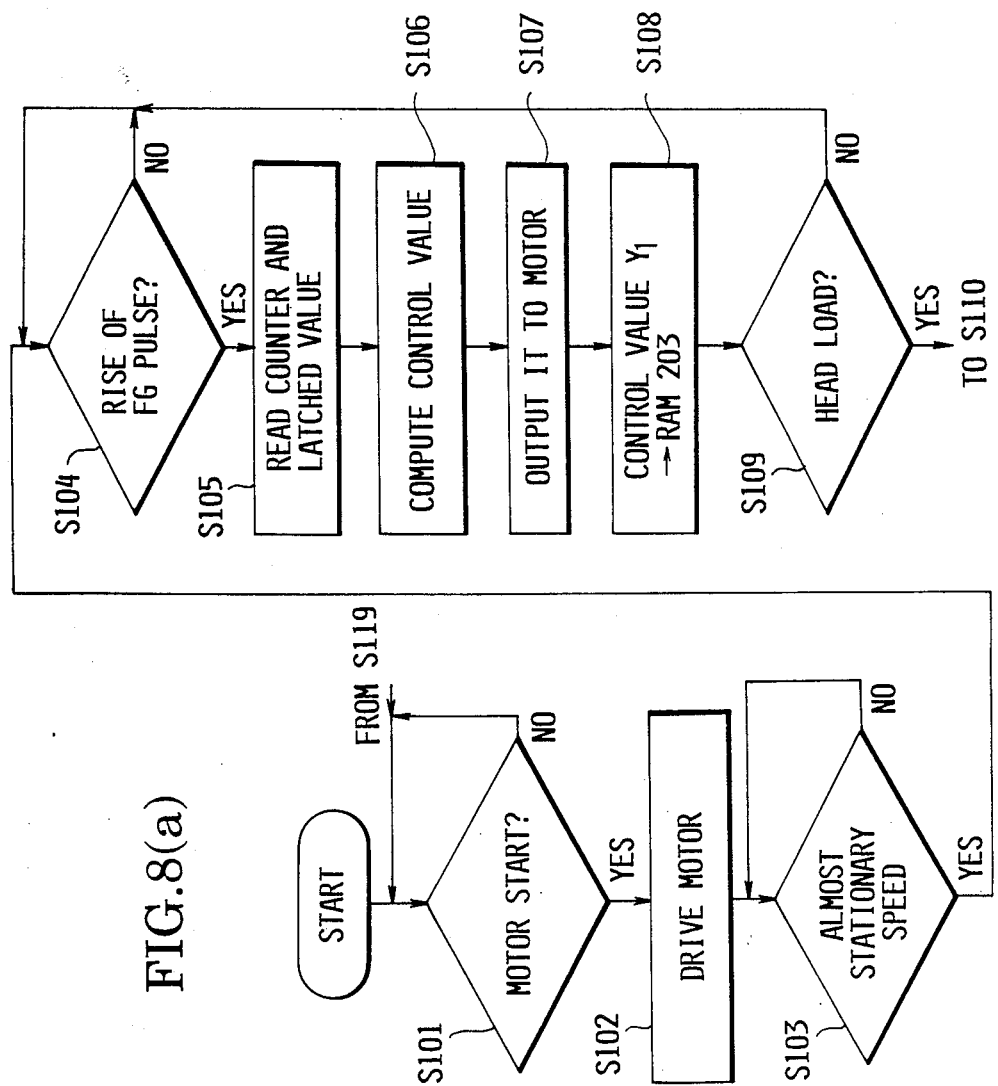
FIGS. 8(a) and 8(b) are flowcharts for a control algorithm.
Figure 8B:
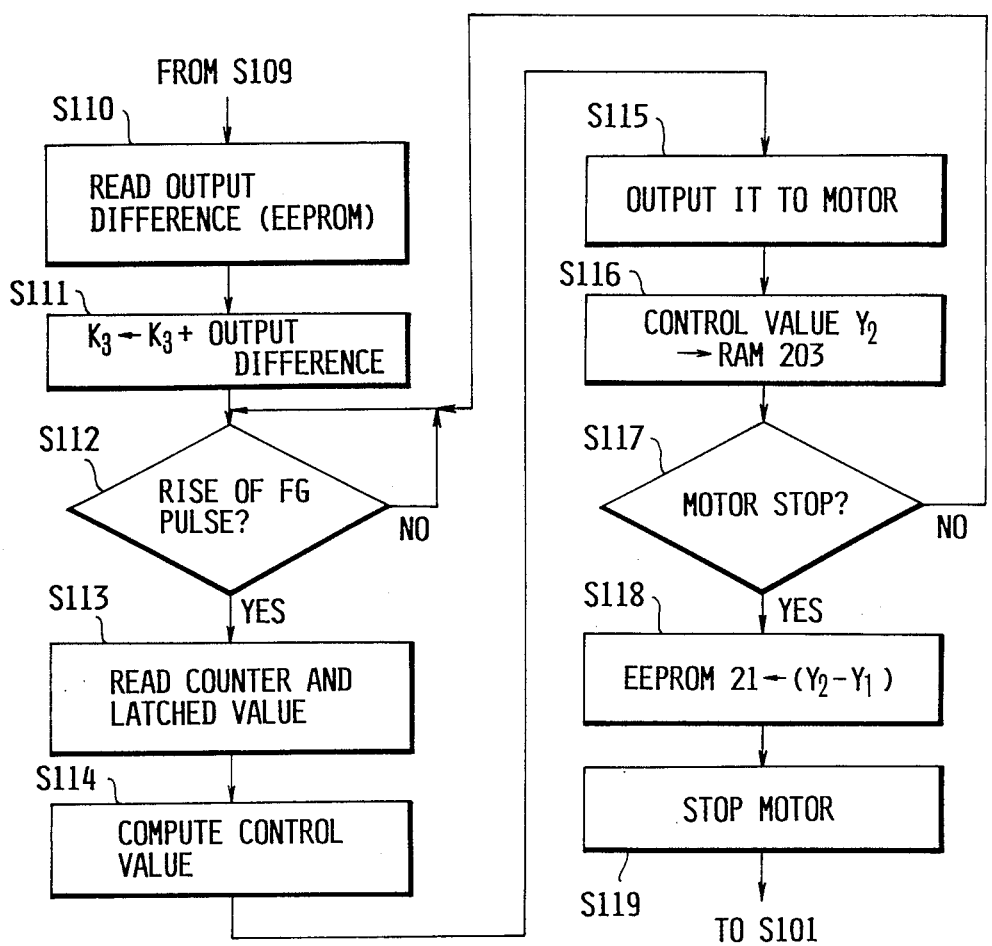
Figure 10A:
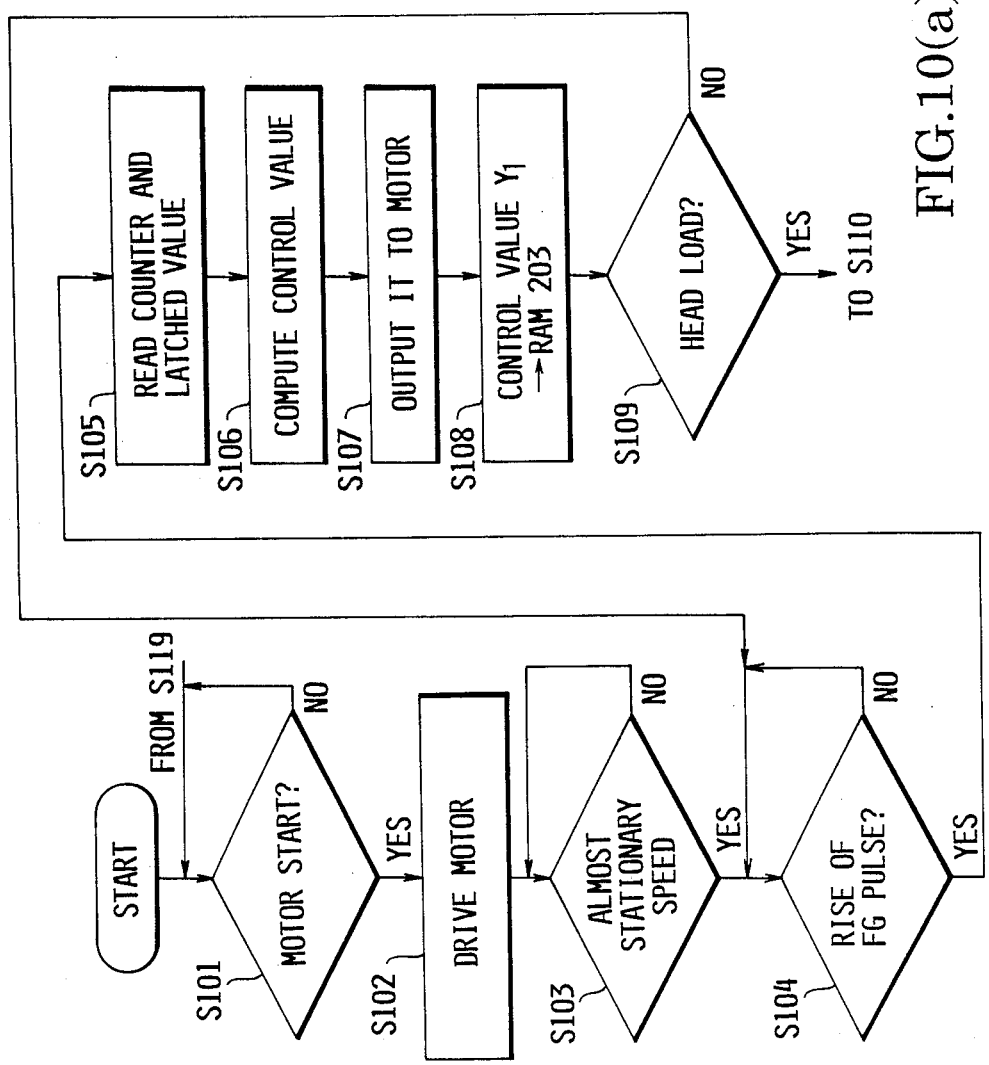
FIGS. 10(a) and 10(b) are flowcharts illustrating a further embodiment of the invention.
Figure 10B:
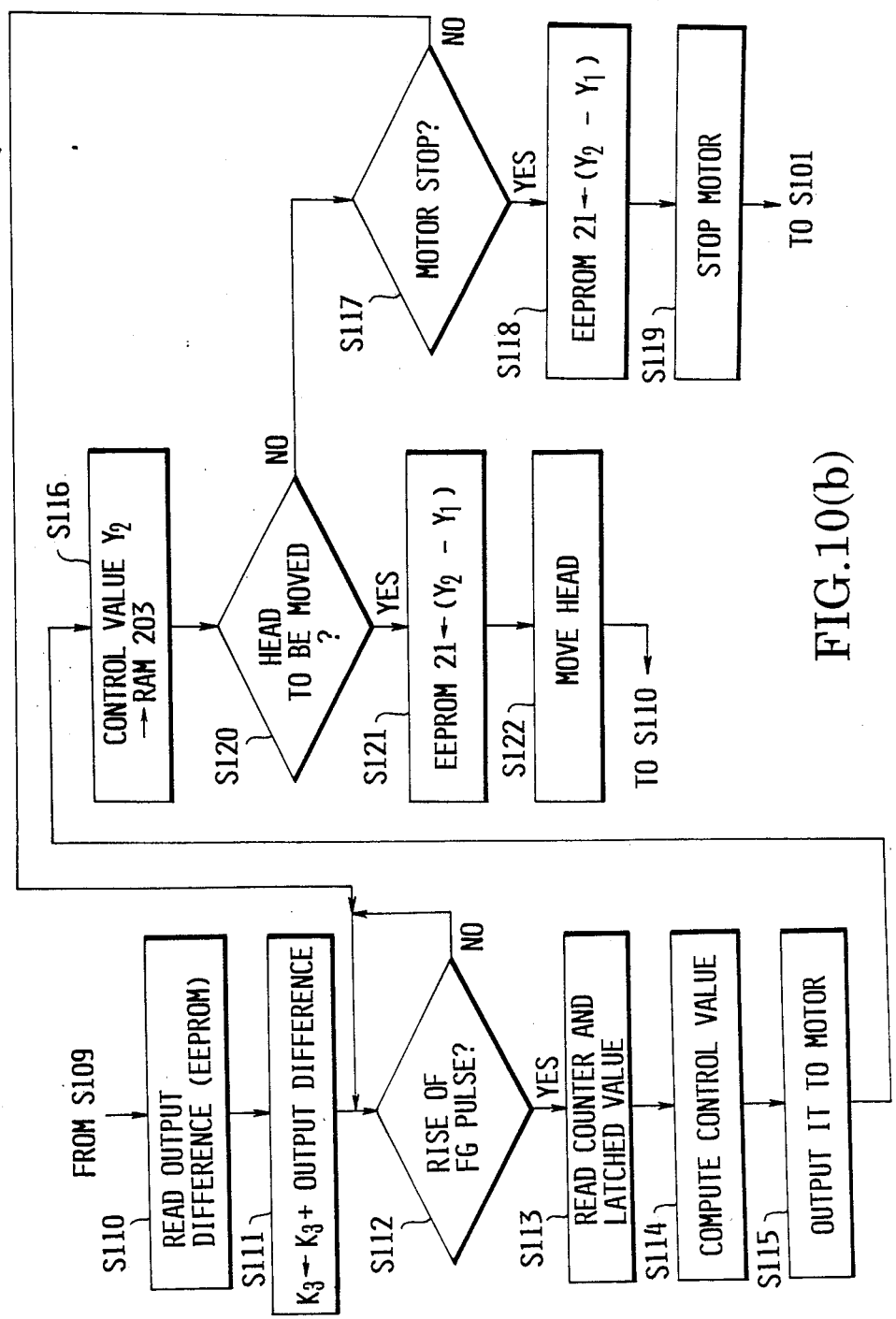

In FIGS. 10(a) and 10(b), the step S101 up to the step S119 are similar to those in the flowchart of FIGS. 8(a) and 8(b). So their explanation is omitted.

In FIGS. 10(a) and 10(b), the motor after the head load comes into the stationary rotation state. After it has been controlled up to the step S116, but before the step S117, whether or not the head 24 is to be moved to another record track is selected in a step S120. If there is no movement of the head 24, then the process advances to the steps, S117, S118, S119. Hence, a similar operation to the operation of FIGS. 8(a) and 8(b) takes place.

If, in the step S120, there has been a request for moving the head, the data is renewed by storing the difference ($Y_2 - Y_1$) between the control value (integration term) in the head position at that time and the control value in the head unload condition in the EEPROM 21 in a step S121. The process then transfers to a step S122 where the head 24 is moved to the designated track. After that, the process returns to the step S110 to read the data of the output difference in the new head load position from the EEPROM 21, in accordance with which the motor speed is controlled.

By carrying out such an operation repeatedly, regardless of whatever position the head 24 takes on the recording medium 1, the speed compensation is instantly made against the load change in that position, thus making it possible to maintain constant the rotation speed of the motor. Also, because the control value in the EEPROM 21 can be renewed each time the head position is changed or the motor stops, it is always possible within the EEPROM 21 that the speed control values in the different load conditions corresponding to a plurality of moved positions of the head 24 are stored in the form of the differences from the control value of the head unload condition and a control data table is formed.

It should be noted that if the above-described control operation of the flowchart is carried out in the initialization at the time of loading the recording medium, a table of the control data corresponding to each head position can be formed before the actual recording or reproducing operation.

By the foregoing operation, even if any load change happens, for example, by loading the head, the speed of the motor is not caused to change largely, but can be driven at an almost stationary speed. Also, even if the speed changes, the range of its variation is limited to a minimum. Hence, it is made possible to swiftly return the rotation of the motor to the stationary speed.

Also, according to this embodiment, the difference of the stationary term in each head load condition from that in the head unload condition is memorized, and the information on this difference is applied when the load changes. Therefore, a quantity of compensation of the control system is so small that it does not largely change the characteristic of the feedback loop. Thus, stable and excellent-in-responsiveness control can be made.

What is claimed is:

1. A speed control device for controlling the speed of a motor by a feedback control system including a proportion term proportional to information on a deviation of the speed of the motor from a speed set value and an integration term obtained by integrating the information on the deviation with respect to time, comprising:
   (A) motor driving means for rotating said motor in a plurality of load conditions including a reference load condition;
   (B) memory means for storing a value of the difference in the integration term obtained between when said motor has come into a stationary rotation state in said reference load condition and when said motor has come into the stationary rotation state in a load condition other than said reference load condition in each of said plurality of load conditions; and
   (C) control means for controlling a rotation of said motor by using a value of the difference in the integration term stored by said memory means and corresponding to the load condition in which said motor in.

2. A device according to claim 1, wherein said motor is a motor for rotating a disc-shaped recording medium.

3. A device according to claim 2, further comprising:
   (D) head means for performing a recording or reproduction on said disc-shaped recording medium; and
   (E) head moving means for moving said head means in a radial direction of said disc-shaped recording medium to concentrically or spirally perform the recording or reproduction on said recording medium.

4. A device according to claim 3, further comprising:
   (F) head loading means for moving said head means to a head load position at which said head means is in contact with said recording medium to perform the recording or reproduction and an unload position at which said head means is separated from said recording medium.

5. A device according to claim 4, wherein said reference load condition of said motor is a stationary rotation state in a condition where said head means is kept in said unload position relative to said recording medium.

6. A device according to claim 5, wherein a load condition of said motor differs depending on head load positions at which said head means is loaded onto said recording medium, and wherein said memory means stores the difference between a value of the integration term in the stationary rotation state of said motor in each of the head load positions and a value of the integration term in said reference load condition.

7. A device according to claim 6, wherein said head moving means moves said head means in units of a record track on said recording medium, and wherein said memory means stores the difference between a value of the integration term in a head load condition in each of head moved positions on said recording medium and a value of the integration term in said reference load condition.

8. A device according to claim 6, wherein said control means supplies a value of said difference stored in said memory means and corresponding to a moved position of said head means to said motor driving means each time said head means is moved by said head moving means.

9. A recording or reproducing apparatus for performing a recording or reproduction by bringing a head into contact with a driven recording medium, comprising:
(A) speed control means having a control system including a proportion term proportional to information on the difference between a speed set value and a driving speed of said recording medium and an integration term obtained by integrating the information on said difference with respect to time;
(B) head loading means for controlling said head to be in one of a head load condition in which said head is in contact with said recording medium and a head unload condition in which said head is separated therefrom;
(C) head moving means for moving said head to an arbitrary position on said recording medium;
(D) memory means for storing the difference in the integration term obtained between at the time of a stationary drive speed of said recording medium in said head unload condition and at the time of the stationary drive speed of said recording medium in said head load condition in each position of said head moved by said head moving means; and
(E) supply means for supplying the integration term corresponding to a position of said head in said head load condition to said speed control means.

10. An apparatus according to claim 9, wherein said recording medium is a disc-shaped recording medium.

11. An apparatus according to claim 10, wherein said recording medium is a flexible magnetic disc, and wherein said head is a magnetic head.

12. An apparatus according to claim 9, wherein said supply means supplies said integration term to said speed control means just before said recording medium reaches the stationary drive speed.

13. An apparatus according to claim 9, wherein said speed control means includes a motor for rotating said recording medium and a frequency generator for generating FG pulses of a frequency corresponding to a rotation speed of said motor, and wherein said rotation speed is detected by measuring a period of the FG pulses.

14. An apparatus according to claim 13, further comprising a clock generator and wherein said speed control means detects said rotation speed by counting clock pulses generated by said clock generator between said FG pulses.

15. An apparatus according to claim 9, wherein said memory means stores the difference between the integration term in a stationary rotation state just before said recording medium is stopped and the integration term in said head unload condition.

16. A recording or reproducing apparatus for performing a recording or reproduction by bringing a head into contact with a driven recording medium, comprising:
(A) speed control means for controlling a motor for rotating said recording medium to rotate at a constant speed by a speed control value corresponding to information on the difference between a speed set value and a rotation speed of said motor;
(B) head loading means for controlling said head to be in one of a head load condition in which said head is in contact with said recording medium and a head unload condition in which said head is separated therefrom;
(C) head moving means for moving said head to an arbitrary position on said recording medium;
(D) memory means for storing a speed control value of said motor in a stationary rotation state in the load condition in each position of said head moved by said head moving means; and
(E) supply means for supplying a speed control value corresponding to a position of said head in said head load condition to said speed control means.

17. An apparatus according to claim 16, wherein information to be stored in said memory means is information on the difference between the speed control value obtained when said motor is in the stationary rotation state in said head unload condition and the speed control value in the stationary rotation state in said head load condition.

18. An apparatus according to claim 17, wherein said supply means, responsive to a loading operation of said head, reads a stored value corresponding to a position of said head from said memory means and supplies said stored value to said speed control means.

19. An apparatus according to claim 18, wherein said supply means renews a previous stored value by storing the speed control value obtained just before said motor is stopped.

20. An apparatus according to claim 19, wherein said memory means is an electrically erasable programmable read-only memory (EEPROM).

21. An apparatus according to claim 18, wherein said supply means reads a speed control value corresponding to a position of said head from said memory means and supplies said speed control value to said speed control means each time the position of said head changes relative to said recording medium.

22. An apparatus according to claim 21, wherein said supply means renews a previously stored value by storing the speed control value obtained just before said motor is stopped.

23. A speed control device comprising:
(A) drive means for driving a control object having a plurality of load conditions to be driven at a set constant speed;
(B) memory means for storing information on the difference between each of speed control values obtained when said control object is driven at said set speed in said plurality of load conditions and a speed control value obtained when said control object is driven with no load; and (C) control means for reading information on said difference corresponding to a load condition in which said control object is driven from said memory means and for supplying said information to said drive means.

24. An apparatus according to claim 23, wherein said control means applies compensation to said speed control value in response to a change in the load condition of said control object.

25. An apparatus according to claim 24, wherein said control means renews a stored information each time the load condition of said control object changes.

* * * * *

UNITED STATES PATENT AND TRADEMARK OFFICE
CERTIFICATE OF CORRECTION

PATENT NO. : 4,965,682
DATED : October 23, 1990
INVENTOR(S) : Shigeru Jinnai, et al.

It is certified that error appears in the above-identified patent and that said Letters Patent is hereby corrected as shown below:

```
Col. 1, line 31.   Before "head" insert -- In such a still
video apparatus, the magnetic --
Col. 2, line 6.    Change "5,580,084" to -- 4,580,084 --
Col. 2, line 7.    Change "what" to -- that --
Col. 4, line 15.   Delete ","
Col. 5, line 41.   Change "G_2" first occurrence to -- G_1 --
Col. 5, line 48.   Change "affection" to -- effection --
Col. 11, line 64.  Change "held" to -- head --
Col. 12, line 26.  Change "is" first occurrence to -- as --
Col. 12, line 57.  Delete "t"
Col. 12, line 66.  Change "delays" to -- is delayed --
Col. 14, line 43.  Delete "in"
Col. 14, line 44.  After "motor" insert -- is --
```

Signed and Sealed this

Seventh Day of July, 1992

*Attest:*

DOUGLAS B. COMER

*Attesting Officer*     Acting Commissioner of Patents and Trademarks